Sept. 7, 1943.                D. O. BRANT                2,328,950
                              HOMOGENIZER
                         Filed Sept. 26, 1941        2 Sheets-Sheet 1

DAVID O. BRANT,
INVENTOR.
BY
ATTORNEY.

Sept. 7, 1943.  D. O. BRANT  2,328,950
HOMOGENIZER
Filed Sept. 26, 1941  2 Sheets-Sheet 2
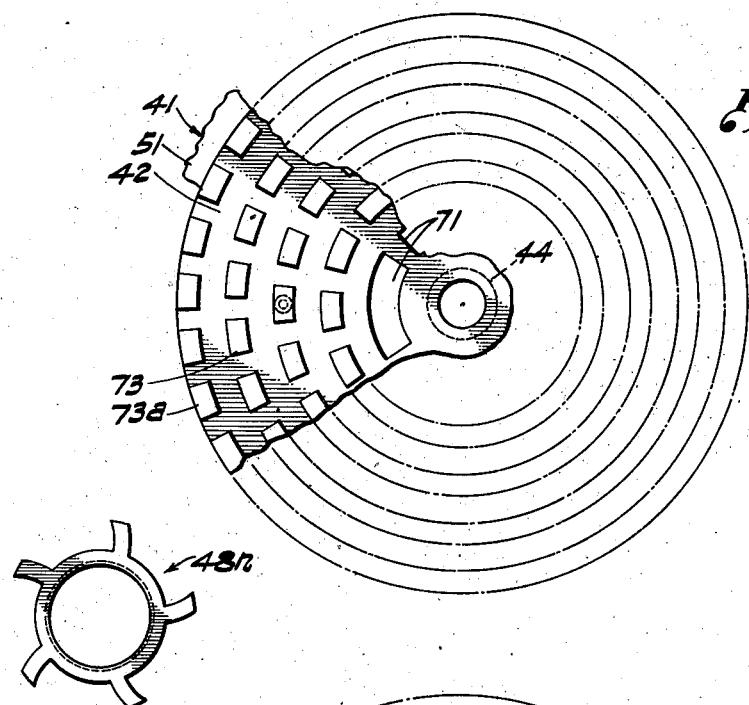
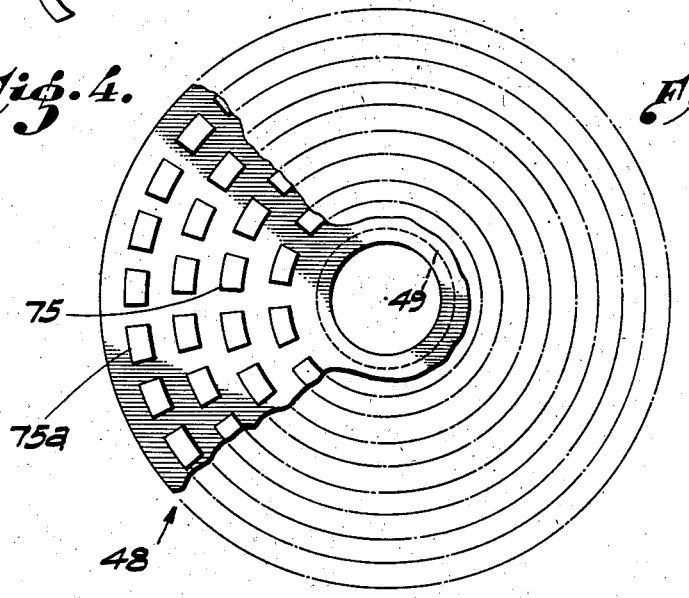
DAVID O. BRANT,
INVENTOR.
BY
ATTORNEY.

Patented Sept. 7, 1943

2,328,950

UNITED STATES PATENT OFFICE 2,328,950

HOMOGENIZER

David O. Brant, Canoga Park, Calif.

Application Sept. 26, 1941, Serial No. 412,445

9 Claims. (Cl. 99—266)

This invention relates to a machine for agitating liquid or semiliquid materials in an extremely rapid manner.

Speaking more specifically, the invention pertains to a machine intended more particularly for homogenizing milk and at the same time utilizing centrifugal force to remove impurities therefrom.

Heretofore, in machinery for use in homogenizing milk, adequate provision has not been made for preventing premature escape of the milk from the moving parts of the machine whereby it is rotationally acted upon, and the undesirable result has been that portions of the milk were delivered from the machine before being properly homogenized.

Also another imperfection has resided in the fact that certain impurities have been allowed to remain in the milk after it has been mechanically treated to homogenize it, and therefore a separate mechanical treatment for the milk has been necessary to purify it in addition to homogenizing it.

With a view to overcoming the above mentioned imperfections in machines already on the market, and also to otherwise advance the art to which the invention pertains, the following are among the objects of the present invention:

To provide a homogenizing machine wherein certain impurities are mechanically removed from the milk partly before and partly after the homogenizing action of the machine. The importance of thus purifying the milk will be better understood when attention is directed to the fact that milk and cream contain leucocyte and epithelial cells. These elements have an affinity for the fat cells in the milk and cling to them and are therefore carried upward with the rising fat globules, thus forming the cream on top of the milk; consequently they are not noticed as sediment underlying the milk body, as would otherwise be the case, for they are heavier than the milk and unless carried upwardly as stated would settle to the bottom.

Homogenization breaks up the fat cells so that they do not rise. Consequently the leucocyte cells, which are darkened by homogenization, will settle to the bottom and form an objectionable dark sediment unless they are removed by the machine simultaneously with the homogenizing operation.

Additional objects of the invention pertain to directing the milk currents back and forth along an angular path in a superior manner; providing a superior arrangement of recesses positioned for acting as pockets to collect impurities from the milk during the homogenizing thereof; to provide an improved attachment for distributing the flow of the milk as it enters the machine so that an initial clarifying effect will be secured; to provide a novel and advantageous air feed supply; to provide improved removable teeth for the rotary homogenizing elements; and to provide an improved means for driving rotatable parts of the machine.

Other objects, advantages and features of the invention will hereinafter appear.

Referring to the accompanying drawings, which illustrate what is at present deemed to be a preferred embodiment of the invention, Fig. 1 is a view of the complete machine showing the same, half in side elevation and the opposite half in vertical mid-section, the fixture at the top of the view being shown in side elevation.

Fig. 2 is a bottom plan view of the upper homogenizing disc; or, said view may be regarded as a section looking upwardly from the plane approximately indicated by the line 2—2 on Fig. 1.

Fig. 3 is a top plan view of the lower homogenizing disc; or, said view may be regarded as a section looking downwardly approximately from the plane indicated by the line 3—3 on Fig. 1.

Fig. 4 is a plan view of a nut whereby the lower homogenizing disc is detachably secured to the shaft whereby said disc is rotated.

Figure 1:
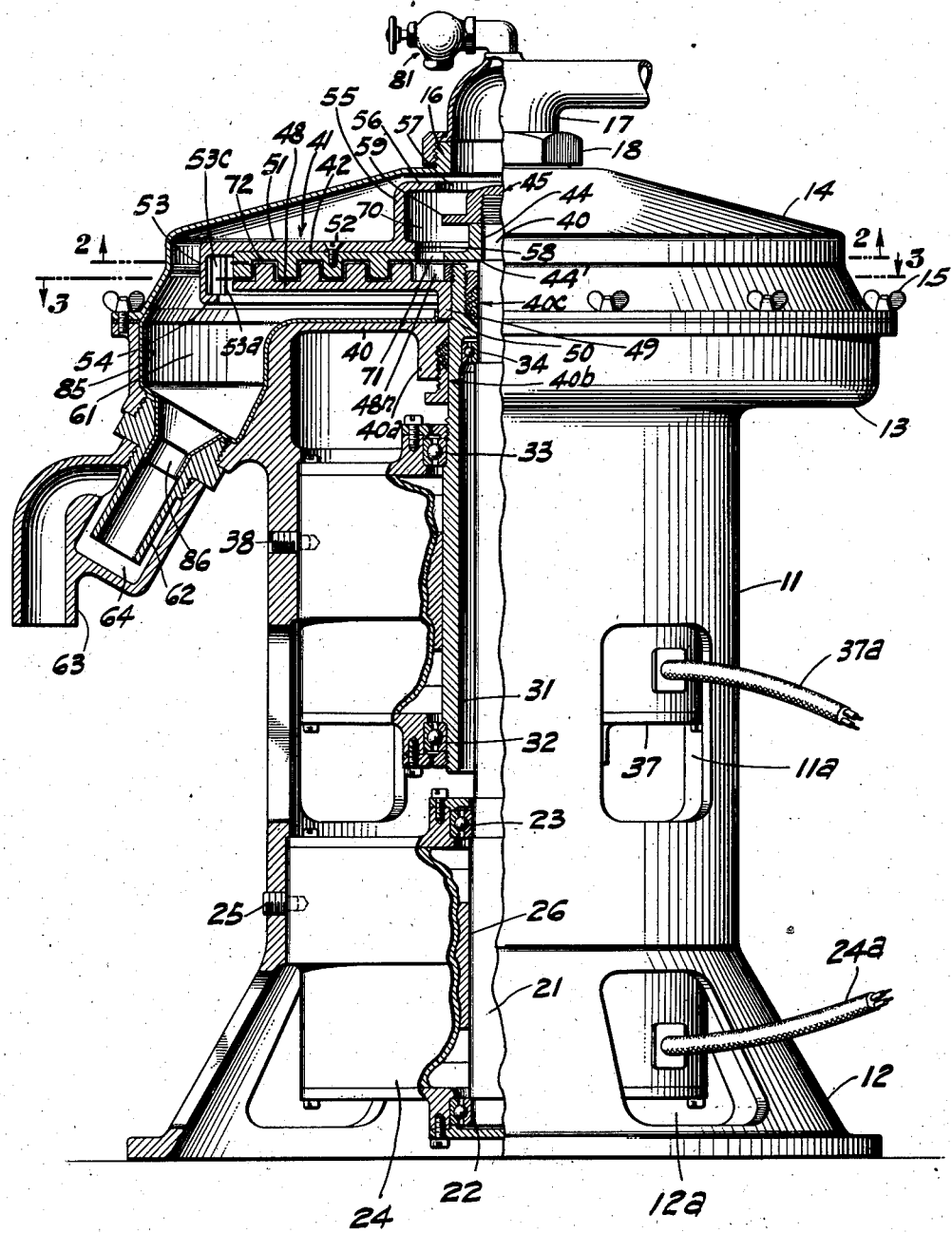

Referring in detail to the drawings, a generally cylindrical casing or housing 11 is shown having an expanded or flared open basal portion 12, the upper portion of this casing being diametrically enlarged thus providing an annular extension 13 therearound. To the upper side of said extension 13 there is detachably secured to the casing a somewhat dome shaped cover 14 by means of winged cap screws 15. The upper part of said cover is centrally provided with an externally screw threaded rise 16 to which is secured a milk supply fitting 17 by means of a clamping nut 18.

An upstanding central shaft 21 is rotatably mounted within the casing 11, said shaft being held in its operative position by means of a lower ball bearing structure 22 and a ball bearing structure 23 which is vertically spaced above said ball bearing structure 22. Said bearings 22 and 23 are carried by a cylindrical motor casing 24, which in turn is supported in any suitable manner, as by a plurality of set screws 25 (one of which is shown) in the lower portion of the casing 11. A portion 26 of the armature of this motor is somewhat diagrammatically shown in section, but the details of the motor are not illustrated, because it is presumed to be of conventional type, and to be operatively related to the shaft 21 in a well known manner.

In the upper portion of the housing is centrally located a vertical cylindrical shaft 31, the lower end of said shaft being surrounded by a ball bearing structure 32 and said shaft being higher up surrounded by a ball bearing structure 33. Also there is provided within the upper portion of said shaft 31 a ball bearing structure 34 which bridges the annular space between the shafts 21 and 31. The bearings 32 and 33 are carried by an upper motor casing 37 which, like the lower motor casing, may be secured internally to the housing by means of set screws 38. The upper portion of the housing has an internally directed annular flange 40 terminating in an annular downward extension 40a within which is a stuffing box structure 40b that prevents the milk from passing downwardly around the shaft 31. A stuffing box structure 40c is inserted between the upper portions of shafts 31 and 21 to keep the milk from passing downwardly into the annular space between these two shafts.

To the upper portion of the central shaft 21 is secured the upper homogenizing disc or member 41. Said member 41 is shown as including a disc 42 having a central aperture 43 surrounded by an annular flange 44. The upper portion of the shaft 21 is screw threaded and also diametrically reduced, and the diametrical reduction thereof providing around the shaft an annular ledge 44' upon which rests the central flanged portion of the disc 42. This part of said disc is clamped down upon said ledge by means of a radially flanged nut 45 which screws onto and closes the threaded upper part of the shaft 21.

An internal cap member 51 overlies the disc 42 and is secured thereto, for example, by means of screws 52 one of which is shown in the upper portion of Fig. 1. Said cap member is provided with a downwardly extending peripheral flange 53 having along its lower edge a narrow inturned lip 54. The inner part of said internal cap 51 is flanged with an upstanding annular flange 55 having an internally directed lip 56 around its top, said lip defining the edge of the milk intake opening 57.

Along the base of its upstanding flange 55 the inner cap member 51 is provided with a narrow lip or ledge 58 which serves to arrest the downward movement of certain impurities in the milk which, during the operation of the machine, will be thrown against the inner face of the flange 55. The nut 45 which has already been mentioned is furnished with a basal annular flange 59 which, when the nut is screwed down, is located at a point vertically spaced away from both the ledge 58 and the flange 56. Hence when the milk enters through the cap opening 57, said flange 59 acts as a baffle plate to direct the milk outwardly against the inner face of the flange 55, upon which flange face certain impurities will collect as hereinafter more fully explained.

The already mentioned peripheral flange 53 of the upper homogenizing member 41 has in its inner face a series of sediment recesses or pockets 53a, these pockets preferably consisting of small vertical grooves. They encircle an annular space 53c, the outer limit of which is defined by said flange and serve to remove any sediment or of the heavier cells that may have passed by the first clarifier, or that may have been added to the milk after it has left the first clarifier, such as dust and small particles of dirt in the machine, or metal particles worn from the machine. These two clarifiers cooperate to clean the milk introduced into the machine and also to remove any sediment that may be possibly added to it during the homogenizing operation.

With the upper rotatable homogenizing disc or member 41 cooperates the lower homogenizing member 48 which is secured to the cylindrical shaft 31 by means of a star nut 48n (see Fig. 4) for rotation in the opposite direction to said member 41. Said member 48 is centrally apertured and has a central downwardly directed flange 49 which fits around the adjacent part of the tubular shaft 31, the lower edge of said flange abutting against an external annular shoulder 50 formed around the cylindrical shaft 31.

A rather spacious milk delivery channel 61 is contained within the ledge or outwardly directed shoulder 13 of the casing 11 and from said channel leads a milk delivery spout 62. An air trap connection 63 is screwed onto said spout 62 thus affording an air trap space 64 so that the air can at no time enter the machine through said spout 62.

Describing more in detail the structure of the disc-like rotatable homogenizing members 41 and 48, the upstanding annular flange 55 with which the central portion of the member 41 is provided produces within it a chamber 70 for receiving the milk after it enters the intake opening 57. From said chamber 70 the milk passes through a series of circularly arranged openings 71 in the disc and is thus lead to the narrow space 72 between the oppositely rotating homogenizing members.

The disc 42 of the upper rotary homogenizing member, shown in bottom plan in Fig. 1, is provided with a multiplicity of teeth 73 and 73a, which are arranged in concentric rows, these rows being radially spaced apart in an equal manner and the teeth in each row being circumferentially spaced. These teeth may be varied in shape and size and to a certain extent in position without departing from the spirit of the claimed invention. As shown in the drawings they are all approximately rectangular in shape, the teeth of the outer rows being greater in number than those of the inner rows. These teeth are staggered in relation to the radius of the disc to prevent any direct radial channel through which a stream of milk might escape without being interrupted in its course.

The lower homogenizing member 48, seen in top plan in Fig. 2, is likewise provided with a multiplicity of teeth 75 and 75a, these teeth being similarly arranged to the teeth 73 and 73a of the upper member 41, but the member 48 does not have any teeth located along its peripheral portion, its teeth 75a of the outer row being inwardly spaced from its periphery, whereas the teeth 73a of the disc 41 are located flush with its periphery.

From a comparison of the teeth of the two homogenizing members as shown in Figs. 2 and 3, as well as from the showing in Fig. 1, it will be seen that the teeth of the two discs are positioned to cooperate, during the simultaneous opposite rotation of the members, to batter the milk back and forth and break it down by means of mechanical force.

The upper homogenizing member 41 is of a greater diameter than the lower member 48 and therefore the centrifugal effect of the upper member upon the milk is more pronounced than that of the lower member, hence a certain amount of outward movement of the milk under the urge of centrifugal force will result, the general effect upon the body of milk between the two discs being to rotate such portions of the milk in the direction in which the upper member 41 is moving. This tendency is increased by the reason of the fact that the upper rotary member 41 is the one of the two members which is provided with the milk intake chamber 70, as well as the outer annular milk chamber 53c and these two chambers contain a quantity of milk which is affected in a centrifugal manner by the rotation of said upper member.

The lower motor 24 is shown provided with a current supply cable 24a which passes through an opening 12a provided for it in the lower portion of the housing, and the upper motor 37 is shown provided with a current supply cable 37a which passes through an opening 11a in the housing.

Owing to the fact that the two rotary homogenizing members are driven by independent motors their speeds of rotation may be varied independently of each other. It is desirable that the upper disc be rotated somewhat faster than the lower one to augment its already mentioned centrifugal effect upon the milk.

As an aid to preventing the milk which passes through the machine from creeping into certain joints between attached parts, I prefer to place an annular pan 85 shown in Fig. 1, into the annular milk receiving chamber 61 before the machine is put into operation. Said pan is shaped to conform to the contour of the inner outer and bottom portions of said chamber 61 and to overlie the annular flange 40 of the housing. Said pan is also provided with a tapered spout portion 86 which projects downwardly into the upper portion of the spout 62 of the outlet fitting.

It is desirable occasionally to remove the motors 24 and 37, together with the shafts 21 and 31. To do this it is necessary first to remove the cover 14 together with the two homogenizing discs after taking off the nuts 48n and 45, whereupon, after loosening the set screws 25 and 38 the two motors together with their shafts may be removed from the flared open end of the casing.

In Fig. 1 the milk supply fitting is shown furnished with an air inlet cock 81 which may be opened when it is desired to admit air to the substance passing through the machine. This cock will seldom be used except when liquid or semi-liquid substances other than milk (for example, pineapple pulp) are being treated or when milk which it is desired to aereate is being passed through the machine.

In the operation of the machine the milk is supplied from any suitable reservoir through the fitting 17 at the top of the housing, thence down through the opening 57 into the chamber 70 located in the dome of the upper homogenizing disc-like member 41, it being understood that the two homogenizing members have already been started to rotate in opposite directions at the desired speed. As the milk enters said chamber 70 it contacts with the flange 59 of the splash nut 45, said flange causing it to be outwardly deflected against the inner face of the annular flange 55, where it is arrested until the thickness of the centrifugally suspended milk becomes greater than the width of the ledge 58, at which time the milk will begin to flow downwardly through the openings 71 of the disc 42 into the space between the two rotating members. As it enters said space it will pass between the prongs of the star nut 48n and will then move outwardly along the narrow tortuous space provided between the two rotating members. As it proceeds through said space the reversely moving teeth of the two members shatter the milk and its constituents. While this is taking place the eddy currents set up by the teeth and discs revolving in opposite directions aid in the volitization of the fat and solids that go to make up the milk. Also counter currents result in the milk whereby the warm liquid is broken down as steam and particles of varying sizes are produced whenever two radial rows of teeth approach and recede from each other.

The teeth of the two cooperating rotary members are so positioned that there are no radial isles through them wherein fluid or currents of air can pass out of the machine without being oppositely deflected a number of times during its course through the machine. This staggering of the teeth in the different rows of each disk aids in the creation of the eddy currents, and the absence of free flowing air through the machine further promotes them.

Were space not permitted in which these eddy currents could flow and liquid expand, the solid, non-compressible liquid would "freeze" the two plates together in a similar manner to the fluid drive in an automobile clutch. This machine does the opposite; it expands the incompressible liquid to a gaseous mixture, the solids of which remain reduced in size and suspended in an emulsion, when reunited. This machine may also be used to advantage to reduce liquids containing larger solids such as fruit pulp and its juices to a semi-solid condition (also ice cream mix and the like).

As the milk flows radially outward from the central portion of the two oppositely rotating discs between which it is being homogenized, the space for the milk widens even though the discs are equally spaced apart throughout all portions of their opposed faces. That is to say, as the milk approaches the peripheries of the discs the circular lanes between adjacent rows of teeth lengthen, so that there is more room for the outwardly flowing milk, hence the expanding and disintegrating effect of the teeth upon the particles of milk is aided rather than retarded as the milk approaches the outer part of the space between the two discs.

The star nut 48n, shown in detail in Fig. 4, is particularly serviceable, at times, when the machine is used for other purposes than homogenizing milk, for example, as a means for pulverizing pineapple and extracting the juice therefrom.

Although the machine in which the invention is embodied has been described as an homogenizer, yet it is to be understood that it may with equal propriety be regarded as an emulsifying and disintegrating machine adapted to treat not only milk but other liquid or semi-liquid substances.

It should be also understood that the present disclosure is for the purpose of illustration only and that this invention includes all modifications and equivalents which fall within the scope of the subject matter claimed.

What is claimed is:

1. In a machine of the kind described, an upstanding, generally cylindrical casing, centrally located vertically spaced apart lower bearings within said casing, a central upstanding rotatable shaft having its lower portion mounted within said bearings and its upper portion located in the upper part of said casing, a cylindrical rotatable shaft surrounding the upper portion of said central shaft, bearing means to maintain said cylindrical shaft in its operative position, an upper homogenizing disc centrally secured to the upper portion of said central shaft to be rotated thereby, a lower homogenizing disc in a cooperative relation to said upper disc and secured centrally to the upper portion of said cylindrical shaft, and dual means located on the same side of said discs to simultaneously rotate said shafts at variable speeds in opposite directions.

2. The subject matter of claim 1 and, said means for rotating said shafts comprising two electric motors, one for each of said shafts, said motors being carried by said casing in surrounding relation to said shafts.

3. In a machine of the kind described, a housing, a pair of homogenizing discs mounted in said housing in a superposed slightly spaced apart cooperative relation to each other to rotate in a horizonal plane, the uppermost of said discs having an annular downwardly directed peripheral flange which surrounds the space between said discs, there being recesses in the inner face of said flange to receive sediment from the milk, milk outlet means communicating with the space which surrounds said lower disc, and means to simultaneously rotate said discs in opposite directions.

4. In a machine of the kind described, supporting means, a pair of disc-like homogenizing members mounted upon said supporting means to rotate in opposite directions, said members being positioned in a concentric parallel adjacent relation to each other with their faces adjacent, each of said members being provided with a multiplicity of homogenizing teeth, the teeth of each member being arranged in concentric circular rows, the teeth of each member projecting into spaces provided for them between the concentric rows of teeth of the other member, the teeth of the entire series of said concentric rows of at least one of said members being staggered circumferentially thereby preventing the occurrence of any straight unobstructed radial passages between the teeth of such member, means to supply the milk to the central portion of the space between said members, and outlet means to receive the milk as it issues from between the peripheral portions of said members.

5. In a machine for homogenizing milk, an upstanding generally cylindrical casing having an inwardly directed annular flange at its top and an open bottom end, an electric motor mounted in the lower portion of said casing and a second motor mounted in said casing above the first recited motor, said upper motor being provided with a tubular shaft the upper portion of which is threaded and extends upwardly beyond said inwardly directed flange of said casing, said lower motor being provided with a shaft having a threaded end portion which extends through and upwardly beyond the end of said tubular shaft, a homogenizing disc mounted on the projecting end portion of said hollow shaft to be rotated by said motor in one direction, and a second homogenizing disc mounted on the projecting end of the shaft of said lower motor to be rotated thereby in a direction which is opposite to the direction of rotation of the other said disc, each of said discs having a set of spaced apart teeth projecting from one of its faces, the teeth of one disc cooperating with those of the other in the homogenizing of the milk, means whereby each of said discs is detachably secured to the shaft upon which it is mounted, a cover for the upper portion of said casing, upon the removal of which access may be had to said discs to detach them from their shafts, and set screws in the wall of the casing whereby said motors are detachably held in place, said motors together with their shafts being removable through the lower end of the casing when said set screws are loosened.

6. In a machine for homogenizing milk, an upstanding, generally cylindrical casing having an inwardly directed annular flange at its top and a flared open bottom end, an electric motor mounted in the lower portion of said casing and a second motor mounted in said casing above the first recited motor, said upper motor being provided with a tubular shaft the upper end of which is threaded and extends upwardly beyond said inwardly directed flange of said casing, said lower motor being provided with a shaft having a threaded end portion which extends through and upwardly beyond the end of said tubular shaft, a homogenizing disc mounted on the protruding end of said hollow shaft to be rotated by said upper motor in one direction, and a second homogenizing disc mounted on the protruding end of the shaft of said lower motor to be rotated thereby in a direction which is opposite to the direction of rotation of the other said disc, a radially pronged nut securing the first recited disc to said hollow shaft and a radially flanged nut securing the other disc to the other shaft, each of said discs being provided with annularly spaced concentric series of equally sized teeth, the outer faces of which lie in the same horizontal plane, the teeth of one disc when operatively related to the teeth of the other disc being interpositioned in such a manner as to provide a tortuous path from the central part of the discs to their peripheries both between the tops and sides of the teeth of each disc in their assembled relation, said upper disc being provided with an annular series of openings which are superjacent to the prongs of said pronged nut through which the milk passes incident to travelling to the tortuous paths aforesaid, said upper disc being provided with a dome having an intake opening through which the milk is introduced incident to its passage through the said annular series of openings subjacent said dome, the flange of said flanged nut occupying a position in said dome which is slightly vertically spaced below said dome's intake opening, the skirt of the vertical wall forming said dome being provided with an annularly, inwardly directed ledge which is spaced vertically below the flange of said flanged nut, the milk passing through said intake opening of said dome contacting the flange of said flanged nut and being thereby deflected against the vertical wall of said dome to in conjunction with said annular ledge give said milk an initial clarification previous to being homogenized by said discs, and means to give the homogenized milk a clarification as it emits from its tortuous paths between the teeth of said discs, the latter means comprising a downwardly directed peripheral flange carried by said upper disc and having sediment pockets, said flange last recited being spaced outwardly from the space between said discs through which the milk emits after its homogenization.

7. The subject matter of claim 6 and, said casing supporting an annular pan into which the homogenized milk is discharged after its clarification as aforesaid, a spout attached to said casing having an opening communicating with said pan, an air trap connection screwed onto said spout and providing an air trap space so that the air can at no time enter the machine through said spout, a detachable cover operatively related to the casing to enclose said pan, and conduit means connected to said cover communicating with the opening in said dome.

8. In a machine of the kind described, an upstanding, generally cylindrical casing, centrally located vertically spaced apart lower bearings within said casing, a central upstanding rotatable shaft having its lower portion mounted within said bearings and its upper portion located in the upper part of said casing, a cylindrical rotatable shaft surrounding the upper portion of said central shaft, bearing means to maintain said cylindrical shaft in its operative position, an upper homogenizing disc centrally secured to the upper portion of said central shaft to be rotated thereby, a lower homogenizing disc in a cooperative relation to said upper disc and secured centrally to the upper portion of said cylindrical shaft, and dual means located on the same side of said discs to simultaneously rotate said shaft in opposite directions.

9. In a machine of the kind described, a housing, a pair of homogenizing discs mounted in said housing in a superposed slightly spaced apart cooperative relation to each other to rotate in a horizontal plane, means carried by said housing to rotate said discs simultaneously in opposite directions, milk supply means communicating with the central portion of the space between said discs, there being a milk collecting space within said housing adjacent to the peripheral portions of said discs, a spout supported by said housing in a position to discharge the milk downwardly from said space, and an air trap connection attached to said spout to prevent the air from entering the machine through said spout during the operation of the machine.

DAVID O. BRANT.